May 2, 1967   B. J. GIORDANO   3,317,097
FISHING EQUIPMENT STORAGE BOX
Filed Dec. 28, 1964   3 Sheets-Sheet 3
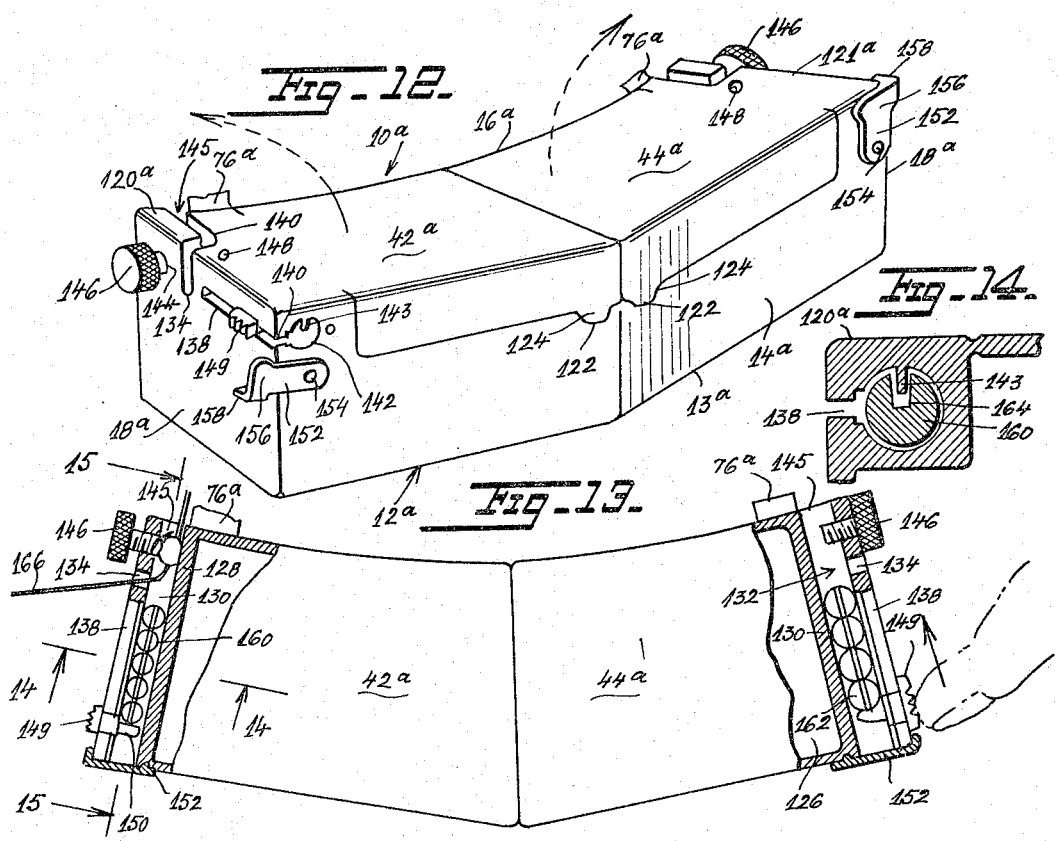
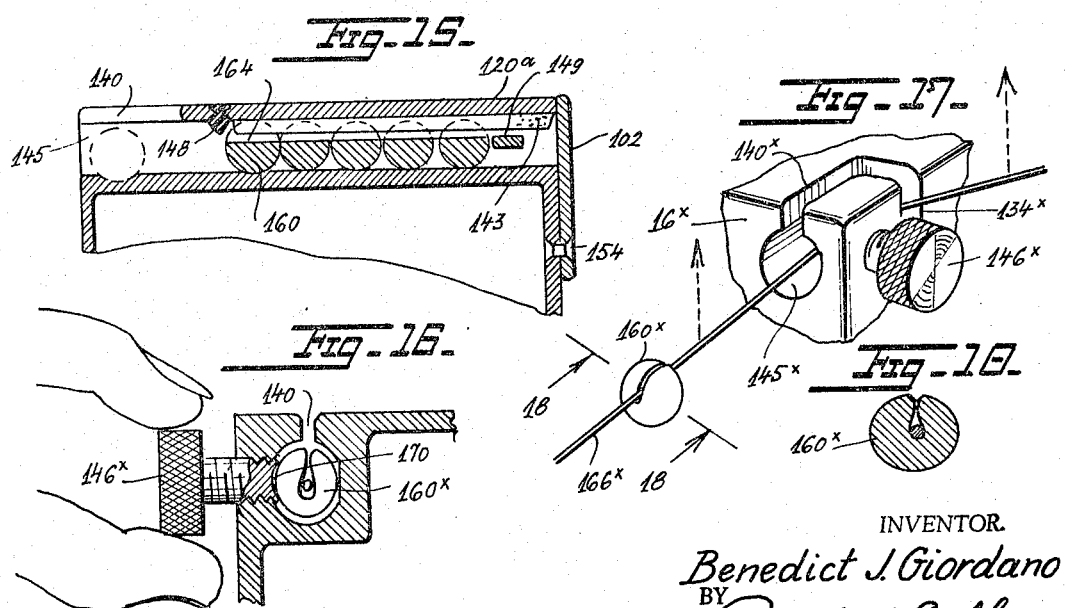
INVENTOR.
Benedict J. Giordano
BY
Polachek & Saulsbury
ATTORNEYS.

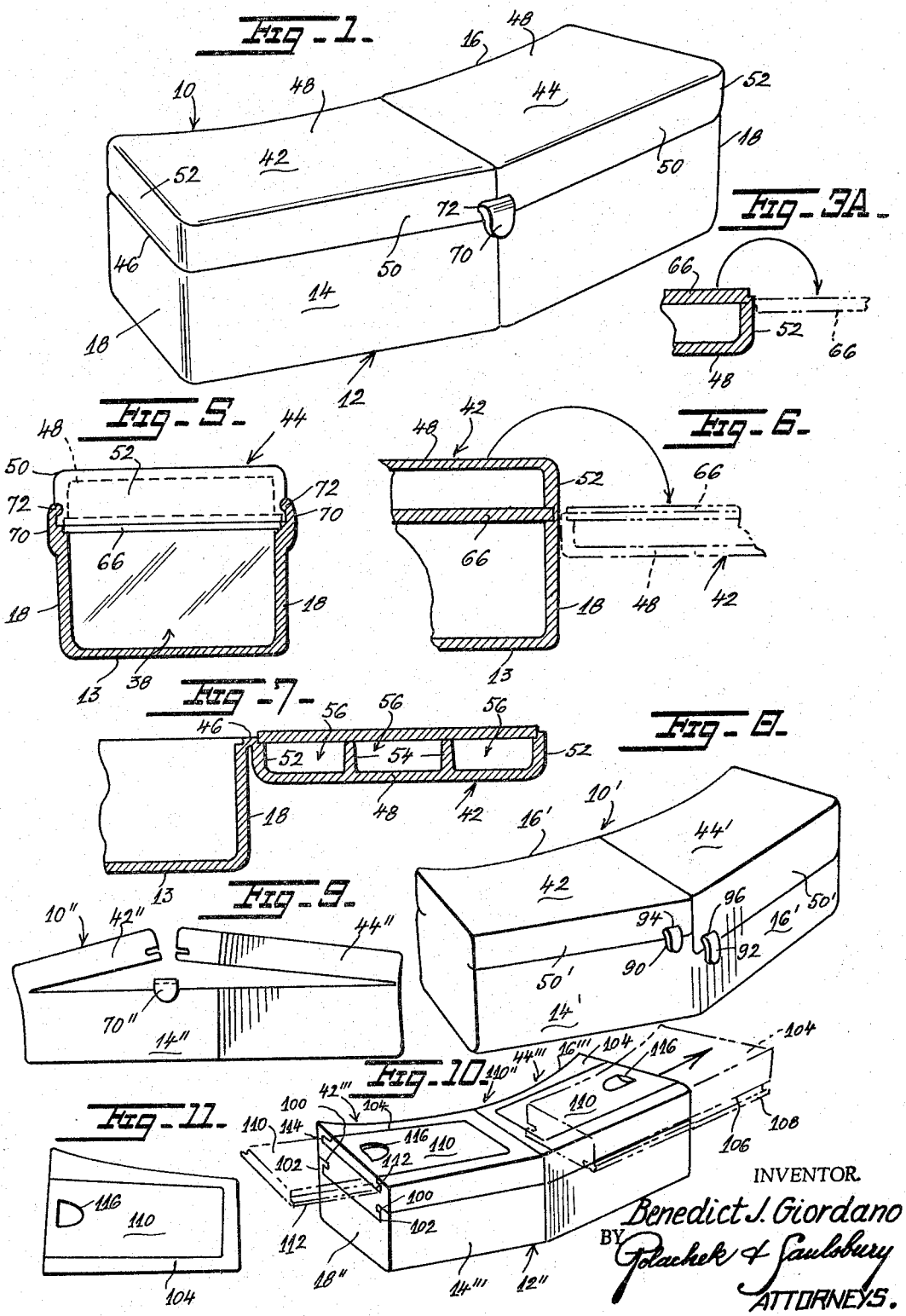

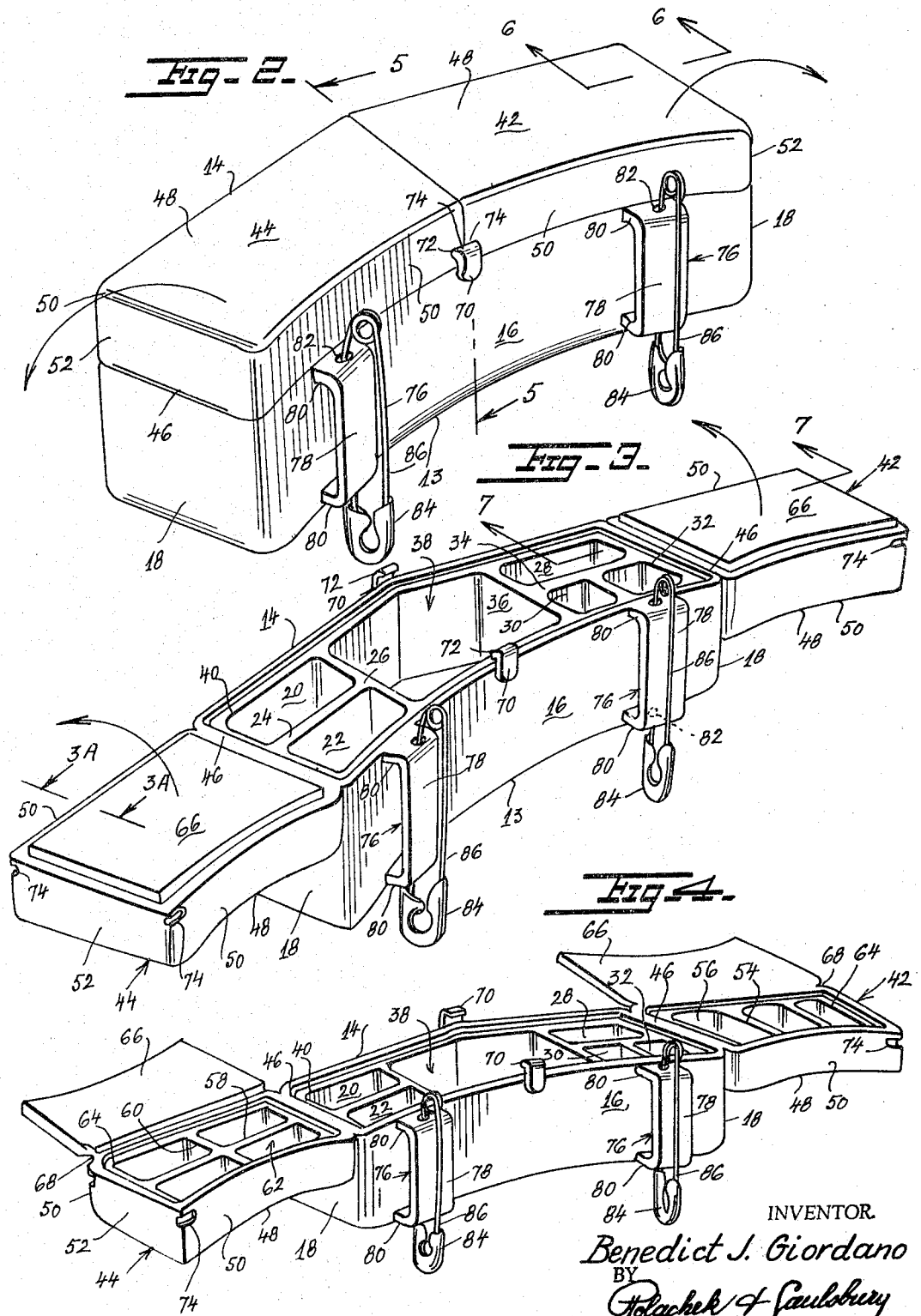

United States Patent Office 3,317,097
Patented May 2, 1967

3,317,097
FISHING EQUIPMENT STORAGE BOX
Benedict J. Giordano, 123 Park St.,
Ridgefield Park, N.J. 07660
Filed Dec. 28, 1964, Ser. No. 421,562
8 Claims. (Cl. 224—5)

This invention relates to the art of fishing and more particularly to a storage box for fishing equipment adapted to be worn on the clothing of a fisherman while fishing.

A primary object of the present invention is to provide ready means for storing small equipment used in fishing supported on the clothing of the fisherman while fishing.

Another object of the invention is to provide a compartmented box with easily opened covers for holding small equipment used in fishing adapted to be releasably attached to the clothing of the fisherman.

Still another object according to a modification of the invention is to provide a box with easily opened compartmented covers.

Yet another object according to a further modification of the invention is to provide a box of this type with a space for storing weighted sinkers with means for guiding and attaching a fishing line to a sinker.

For further comprehension of the invention and of the objects and advantages thereof, reference will be had to the following description and accompanying drawings and to the appended claims in which the various novel features of the invention are more particularly set forth.

In the accompanying drawings forming a material part of this disclosure:

FIGURE 1 is a front perspective view of a fishing box made in accordance with one form of the invention.

FIG. 2 is an enlarged rear perspective view of the box of FIG. 1.

FIG. 3 is a similar view with the covers shown in open condition.

FIG. 3A is a sectional view taken on the line 3A—3A of FIG. 3.

FIG. 4 is a view similar to FIG. 3 with the closure plates of the covers shown in open condition.

FIG. 5 is a cross sectional view taken on the line 5—5 of FIG. 2.

FIG. 6 is a sectional view taken on the line 6—6 of FIG. 2, showing the cover in open condition in dot-dash lines.

FIG. 7 is a sectional view taken on the line 7—7 of FIG. 3.

FIG. 8 is a front perspective view of a fishing box embodying a modified form of the invention.

FIG. 9 is a front elevational view of a fishing box embodying another modified form of the invention.

FIG. 10 is a front perspective view of a fishing box embodying still another modified form of the invention, the covers being shown in partly open condition in dot-dash lines.

FIG. 11 is a top plan view of a slide closure member of a cover of the box of FIG. 10.

FIG. 12 is a front perspective view of a fishing box embodying a still further modified form of the invention.

FIG. 13 is a top plan view thereon, parts being broken away.

FIG. 14 is a sectional view taken on the line 13—13 of FIG. 13.

FIG. 15 is an enlarged sectional view taken on the line 15—15 of FIG. 13.

FIG. 16 is a detail view showing the device for clamping a sinker onto a fishing line.

FIG. 17 is a top perspective view of a corner of the box showing a fishing line threaded therethrough and a sinker thereon.

FIG. 18 is a sectional view taken on the line 18—18 of FIG. 17.

Referring in detail to the various views of the drawings, in FIG. 1 a box made in accordance with one form of the invention is shown and designated generally at 10. The box 10 is formed of light weight metal, plastic material, wood or any other suitable material light in weight. The box has an elongated slightly curved one-piece body 12 relatively deep, open at the top and substantially rectangular in plan. As viewed from FIG. 1 the body has a curved bottom wall 13, a front curved wall 14, a rear curved wall 16 and straight end walls 18, 18.

At both ends, the interior of the body is compartmented, at one end being formed with a pair of parallel compartments 20 and 22 divided by a partition wall 24 and separated from the center of the box by a wall 26. At the other end, the body is formed with an elongated compartment 28 along the front wall 14 and with a pair of compartments 30 and 32 along the rear wall 16, the front and rear compartments being divided by a partition wall 34 and being separated from the center of the body by a partition wall 36.

The front and rear walls of the body together with the walls 26 and 36 define a central compartment 38. The top edges of the front, rear and end walls of the body are countersunk forming a continuous shoulder 40 therearound.

In accordance with the invention, the box body is provided with a pair of covers 42 and 44 hingedly connected to the ends 18 of the body. The covers are formed of the same material as the body and are attached to the ends of the body by means of films or webs formed integrally with the ends and the covers and constituting hinges 46. The covers each comprises a top wall 48 as viewed in FIG. 1, depending side flanges 50, 50 and depending end flanges 52, 52, each cover extending from the adjacent end wall 18 of the box body to midway the ends of the box body where the adjacent end flanges 52 are in juxtaposition. The bottom of the covers are open and extending from the top wall 48 of cover 42 there are spaced partition flanges 54, 54 dividing the interior of the cover 42 into compartments 56, 56, 56, and extending inwardly from the top wall 48 of cover 44 there are crossed partition flanges 58 and 60 dividing the interior of cover 44 into compartments 62. The peripheral edges of the side and end flanges of the covers are countersunk to form continuous shoulders 64 therearound and seated on said shoulders 64 are removable closure plates 66 hingedly connected to the outer long edges of the covers 42 and 44 by integral webs 68.

The covers 42 and 44 are held in closed position as shown in FIGS. 1 and 2 by means of opposed spring latches 70 formed integrally with the front and rear walls 14 and 16. The latches are formed with rounded inwardly extending yielding edges 72, which snap into notches 74 formed at the junctures of the free end walls 52 and adjacent front and rear walls of the covers, the notches intersecting the end and front and rear walls.

The invention contemplates means for detachedly supporting the box 10 on the clothing of the fisherman, such as the waistband of the trousers, and for this purpose, a pair of U-shaped loops 76, 76 is suitably secured to the rear wall 16 adjacent its ends. The bight portions 78 of the loops are spaced from the wall so as to receive a belt or other fastening member for fastening the box onto the waistband of the trousers. The opposed legs 80 of the loops are formed with opposed holes 82 to receive safety pins 84 for fastening the box to the waistband of the trousers without the use of a belt or the like.

In use, the compartments in the box body 12 and in the covers 42 and 44 are filled with fishing equipment and bait needed for a fishing expedition and the box is then fastened to the waistband of the trousers of the fisherman by either passing the belt through the loops 26 or by inserting the shanks 86 of the pins 84 through the material of the waistband. The covers 42 and 44 can readily be opened by manually unlatching them from the latches 70.

In FIG. 8, a fishing box 10' embodying a modified form of the invention is shown. This box 10' differs from box 10 merely in providing separate latches 90 and 92 on front and rear walls 14' and 16' for the covers 42' and 44', respectively. Latch 90 is formed similarly to latch 70 on front wall 14' and snaps into a slot 94 in flange 50' of cover 42'. Latch 92 is also formed similarly to latch 70 on front wall 16' and snaps into a slot 96 in flange 50' of cover 44', the flange 50' being slightly wider than flange 50' of cover 42'.

FIG. 9 illustrates a fishing box 10" similar to box 10 except that the cover 44" is larger than the cover 42" and the latches 70" on the front 14" and rear wall (not shown) are formed in line with the free end of cover 42".

In FIG. 10, a fishing box 10''' embodying still another modified form of the invention is shown. Box 10''' is compartmented similarly to box 10 but is provided with sliding cover units 42''' and 44''' in place of the hinged covers 42 and 44 of box 10. In box 10''', the end walls 18''' of the box body 12''' are formed with opposed inwardly extending projections 100, on the top edges thereof, the projections and top edges defining U-shaped notches 102. Rectangular shaped frames 104 are slidable over the top edges of the front and rear walls 14''' and 16''', in opposite directions, the inner ends of the frames adapted to abut. The bottom ends of the sides of the frames are formed with grooves 106 therealong and with rails 108 below the grooves, the grooves being adapted to receive the projections 100 on the end walls 18''' and the rails 108 being adapted to ride in the notches 102 in the end walls 18'''.

The opening in each frame 104 is adapted to be closed by a sliding closure plate 110 formed with a projecting side rail 112 along its bottom side edges slidable in opposed grooves 114 formed in the inner sides of the frame 104. Each closure plate 110 is formed with a recess 116 adjacent its outer end for receiving a finger of the operator to facilitate movement of the closure plate.

In use, access may be had to the interior of the box 10''' by merely sliding the closure plates 100 outwardly but if desired, the cover units 42''' and 44''' may be removed by sliding them outwardly.

Referring now to the modification of the invention shown in FIGS. 12 to 18, inclusive, the fishing box 10a herein consists of a hollow rectangular slightly curved body 12a having a front wall 14a, rear wall 16a, and walls 18a, 18a and bottom wall 13a. The top of the box is closed by opposed hinged covers 42a and 44a formed integrally with top wall sections 120a, 121a. The top edges of the front and rear walls 14a and 16a are formed with pairs of closely spaced notches 122, 122 in order to receive depending lugs 124, 124, on the hinged covers. The covers 42a and 44a swing open and closed in the direction of the arrows in FIG. 12. The box body 12a is formed with a single inner compartment 126.

End partition walls 128 and 130 divide the interior compartment 126 from narrow compartments 130 and 132 at the ends of the body. Intersecting vertical and horizontal slots 134 and 136 respectively are formed in the end walls 18a and top wall sections 120 and 121, communicating with the compartments 130 and 132. Another horizontally disposed slot 138 is formed in each end wall 18a and continues into a similarly disposed slot 140 in the front wall 14a, slot 140 terminating in a rounded terminal 142. A similar rounded terminal 145 is formed in rear wall 16a opposite hole 142 intersecting slot 140. Slots 138 and 140 communciate with the compartments 130 and 132 and are in alignment with the bottom of vertical slots 134. Flanges 143 depend from the under surfaces of the top wall sections 120 and 121 in line with the rounded terminals 142. A hole 144 is formed in each end wall 18a in line with slot 138 outwardly of vertical slot 134, to receive a set screw 146. Holes are formed in the top wall sections 120 and 121 to receive soft rubber detents 148 at the ends of flanges 142. Slides 149 are mounted in the slots 138 and have shanks 150 slidable along the inner edges of the flanges 143. Latch members 152 are pivotally mounted on pivot pins 154 in the front walls 14a in line with the round terminals 142. The latch members are formed with enlarged head portions 156 adapted to cover and close the terminals 142 and are formed with angular extensions 158 adapted to contact the end walls 18a to limit inward swinging movement of the latches. U-shaped loops 76a are mounted on the rear wall 16a for attaching the box to a belt worn by the fisherman.

In use, fishing equipment is mounted in the compartment 126 of the box, the covers 42a and 44a swinging upwardly and outwardly in the direction of the arrows of FIG. 12 to permit insertion and removal thereof. A supply of weighted sinkers 160 is stored in compartment 130 and a similar supply of weighted sinkers 162 of larger dimensions is stored in compartment 132. The sinkers 160 and 162 are substantially spherical in shape with a slot 164 radiating from the center of each sinker. The sinkers are fed into the compartments 130 and 132 through the round terminals 142 in front wall 14a and pushed along the flanges 143 which open the slots 164 and guide the sinkers therealong, the slides 149 having first been removed from the slots 138. When the sinkers are mounted on the flanges 143, the slides 149 are reinserted outwardly of the sinker nearest the front wall 14a as seen in FIG. 13 so that the sinkers may be shoved along the flanges 143 and the innermost sinker nearest rear wall 16a shoved off of the flange 143 to a position opposite the set screw 146. The end of the fishing line 166 is then threaded through the vertical slot 134 and horizontal slot 140 and into the slot 164 in the sinker 160 or 162 to the base of said slot whereupon the screw 146 is set upon pressing the walls and edges of the slot 164 in the sinker into contact with each other thereby clamping the sinker onto the line. With the sinker thus clamped to the line, the sinker and line are pulled through the round hole 145 in the rear wall 16a.

The sinkers 162 in compartment 132 are larger than sinkers 160 in compartment 130 so that a larger slide 149 is shown for shoving the sinkers along the flange 143.

When the compartments 130 and 132 are fully loaded with sinkers, the latching devices 152 are swung to closed position as shown at the right hand side of FIG. 12.

In FIGS. 16 to 18, inclusive, a modified form of set screw 146x for clamping the sinkers 160x onto the line 166x is shown. The end edge of the shank of the screw is formed with a dished face 170 so that a larger contacting area is provided for pressing against the sinker to close the walls and edges of the slot around the line. When pressure on the set screw is relieved, the sinker may be pulled outwardly of the rear wall 16x through hole 145x therein, and the line may be removed from the compartment upwardly through the slots 140x and 134x in the direction of the arrows in FIG. 17.

While I have illustrated and described the preferred embodiments of my invention, it is to be understood that I do not limit myself to the precise constructions herein disclosed and that various changes and modifications may be made within the scope of the invention as defined in the appended claims.

Having thus described the invention, what I claim as new, and desire to secure by United States Letters Patent is:

1. A fishing box comprising an elongated rectangular shaped hollow body open at the top end divided into a single central compartment and a plurality of end compartments, a pair of hinged covers closing the open top, and latching means for holding the covers in closed position, including a latch member integral with one of the long walls of the body, said covers having notches receiving portions of said latch member for releasably holding the covers in closed position.

2. A fishing box comprising an elongated rectangular shaped hollow body open at the top end divided into a single central compartment and a plurality of end compartments, a pair of hinged covers closing the open top, and latching means for holding the covers in closed position, including a latch member integral with one of the long walls of the body, said covers having notches receiving portions of said latch member for releasably holding the covers in closed position, said covers having compartments interiorly thereof.

3. A fishing box comprising an elongated rectangular shaped hollow body open at the top end divided into a single central compartment and a plurality of end compartments, a pair of hinged covers closing the open top, and latching means for holding the covers in closed position, including a latch member integral with one of the long walls of the body, said covers having notches receiving portions of said latch member for releasably holding the covers in closed position, said covers having compartments interiorly thereof, and closure plates hingedly carried by the covers for closing the compartments therein.

4. A fishing box comprising an elongated rectangular shaped hollow body open at the top end divided into a single central compartment and a plurality of end compartments, a pair of hinged covers closing the open top, and latching means for holding the covers in closed position, including a latch member integral with one of the long walls of the body, said covers having notches receiving portions of said latch member for releasably holding the covers in closed position, said covers having compartments interiorly thereof, and closure plates hingedly carried by the covers for closing the compartments therein, and means for supporting the box body on an article of clothing worn by a fisherman.

5. A fishing box comprising an elongated rectangular shaped hollow body open at the top end divided into a single central compartment and a plurality of end compartments, a pair of hinged covers closing the open top, and latching means for holding the covers in closed position, including a latch member integral with one of the long walls of the body, said covers having notches receiving portions of said latch member for releasably holding the covers in closed position, said covers having compartments interiorly thereof, and closure plates hingedly carried by the covers for closing the compartments therein, and means for supporting the box body on an article of clothing worn by a fisherman, including spaced loops on a long wall of the box body.

6. A fishing box comprising an elongated rectangular shaped hollow body open at the top and divided into a single central compartment and a plurality of end compartments, a pair of hinged covers closing the open top, and latching means for holding the covers in closed position, including a latch member integral with one of the long walls of the body, said covers having notches receiving portions of said latch member for releasably holding the covers in closed position, said covers having compartments interiorly thereof, and closure plates hingedly carried by the covers for closing the compartments therein, and means for supporting the box body on an article of clothing worn by a fisherman, including spaced loops on a long wall of the box body, and safety pins carried by said loops.

7. A fishing box comprising an elongated rectangular shaped hollow body having a bottom wall, slightly curved front and rear side walls and end walls and being open at the top, partition walls between the side and end walls dividing the interior of the body into a single central compartment and a plurality of end compartments, covers hinged to the end walls closing the top ends of the compartments, and means for latching the covers to the side walls, said covers having compartments interiorly thereof, and closure plates hingedly carried by the covers for closing the compartments therein, and loops carried by the rear side wall for receiving a flexible member for attaching the body to an article of clothing worn by a fisherman, and safety pins carried by the loops for insertion into the material of an article of clothing worn by a fisherman for supporting the box body thereon.

8. A fishing box comprising an elongated rectangular shaped hollow body open at the top and divided into a plurality of compartments, a pair of hinged covers closing the open top, and latching means for holding the covers in closed position, said means including a latch member integral with one of the long walls of the body remote from the middle thereof, said covers having notches adapted to interlock with portions of said latch member.

References Cited by the Examiner

UNITED STATES PATENTS

| | | | |
|---|---|---|---|
| 142,887 | 9/1873 | Baldwin | 206—12 |
| 324,829 | 8/1885 | Gaskill | 217—17 |
| 513,044 | 1/1894 | Handlan | 320—20 |
| 1,140,625 | 5/1915 | Spitzler. | |
| 1,525,195 | 2/1925 | Olson | 43—54.5 |
| 1,549,400 | 8/1925 | Wimler | 220—20 X |
| 2,295,950 | 9/1942 | Houlihan | 220—31 |
| 2,850,220 | 9/1958 | Ehrler et al. | 224—5 |
| 3,080,087 | 3/1963 | Cloyd | 220—31 |
| 3,100,056 | 8/1963 | Friday | 220—31 X |

FOREIGN PATENTS

| | | |
|---|---|---|
| 1,043,344 | 6/1953 | France. |
| 1,319,370 | 1/1963 | France. |

THERON E. CONDON, *Primary Examiner.*

MARTHA L. RICE, *Examiner.*